Nov. 8, 1932.    A. J. VASSELLI    1,886,767
BRAKE AND CLUTCH CONTROL FOR MOTOR VEHICLES
Filed April 21, 1931    3 Sheets-Sheet 1

INVENTOR
Anthony J. Vasselli
BY
Warren E. Willis.
ATTORNEY

Nov. 8, 1932.  A. J. VASSELLI  1,886,767
BRAKE AND CLUTCH CONTROL FOR MOTOR VEHICLES
Filed April 21, 1931   3 Sheets-Sheet 2
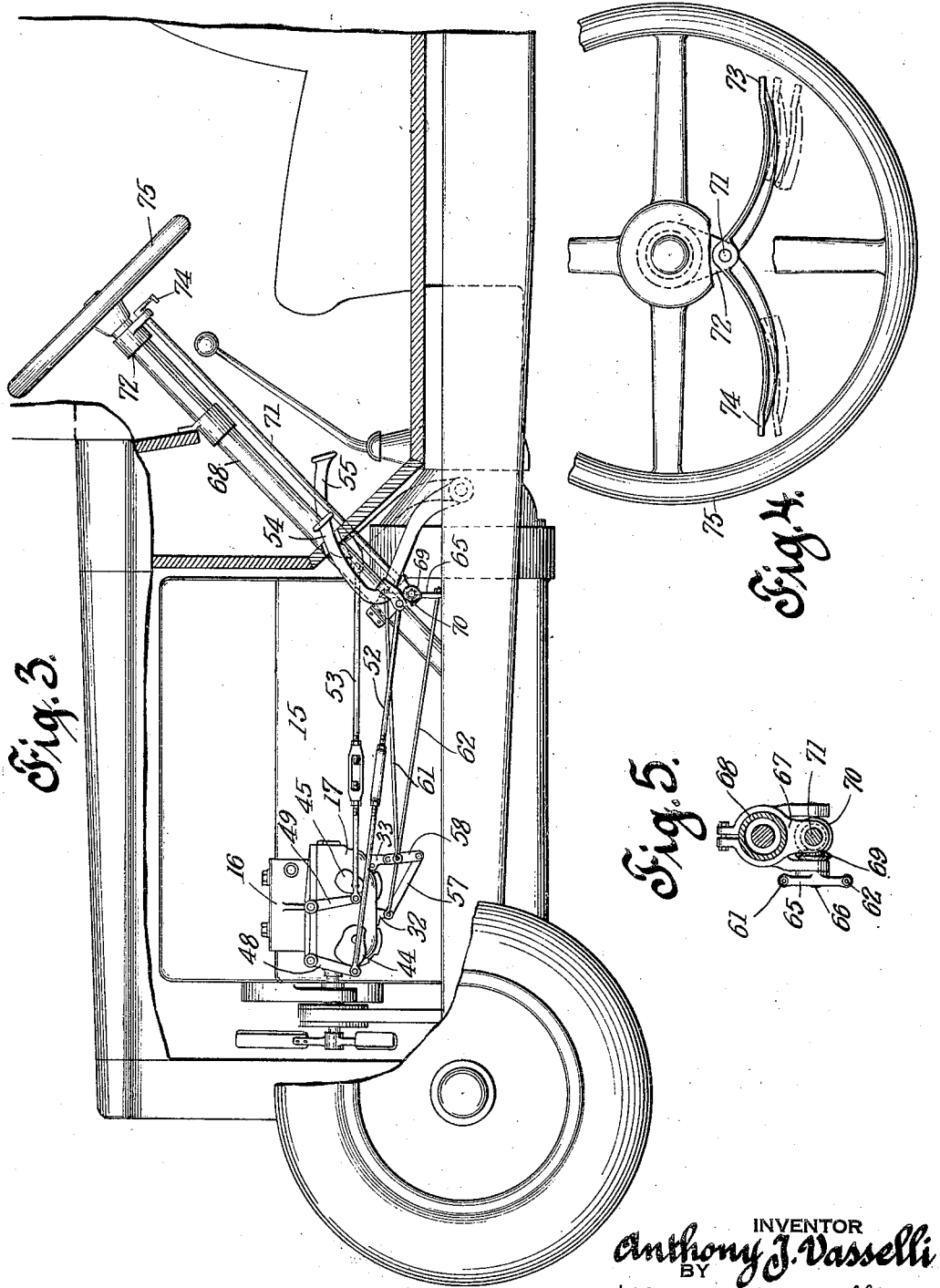
INVENTOR
Anthony J. Vasselli
BY
Warren E. Willis
ATTORNEY INVENTOR
Anthony J. Vasselli
BY
Warren E. Willis
ATTORNEY Patented Nov. 8, 1932

1,886,767

UNITED STATES PATENT OFFICE

ANTHONY J. VASSELLI, OF NEWARK, NEW JERSEY

BRAKE AND CLUTCH CONTROL FOR MOTOR VEHICLES

Application filed April 21, 1931. Serial No. 531,731.

This invention relates to improvements in automobile brake and clutch control devices, of the type indicated in U. S. patent on "automatic brake and clutch control for automobiles", issued to A. J. Vasselli, Sept. 16, 1930, and numbered 1,775,978.

The present invention has as an object to provide a manually controlled mechanism which will release the transmission clutch and apply the brakes, or engage the clutch and release the brakes by the motive power of the engine, instantaneously, or deliberatively as may be desired by the driver and without the usual exertions on pedal levers.

A further feature is in the provision of a simple mechanism capable of wide and extensive use, for automatically stopping and starting a car, reducing the danger and labor of driving to a minimum, and which acts in a smooth, effective and prompt manner.

Other important purposes will appear in the following specification, taken in connection with the accompanying drawings, constituting an essential component of this disclosure, and in which:—

Figure 3 is a side elevational view of the front portion of a conventional automobile, broken away and showing an installation of the device.

Figure 4 is a partial plan view of the steering wheel and control attachment thereon.

Figure 5 is a transverse sectional view of the lower portion of the steering post, brake and clutch actuating rods and actuating spindle.

Figure 1:
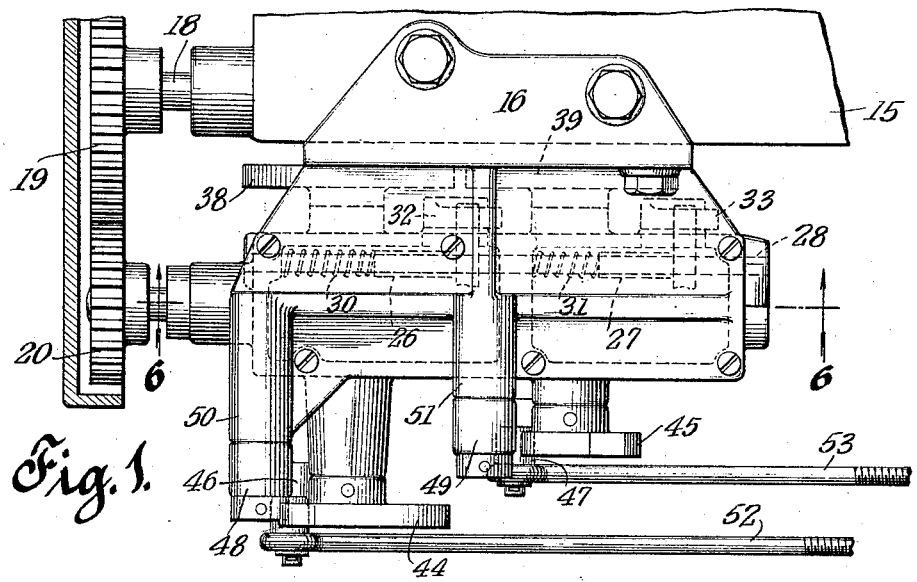
Figure 1 is a top plan view of an embodiment of the invention attached to the vehicle motor block.
Figure 2:
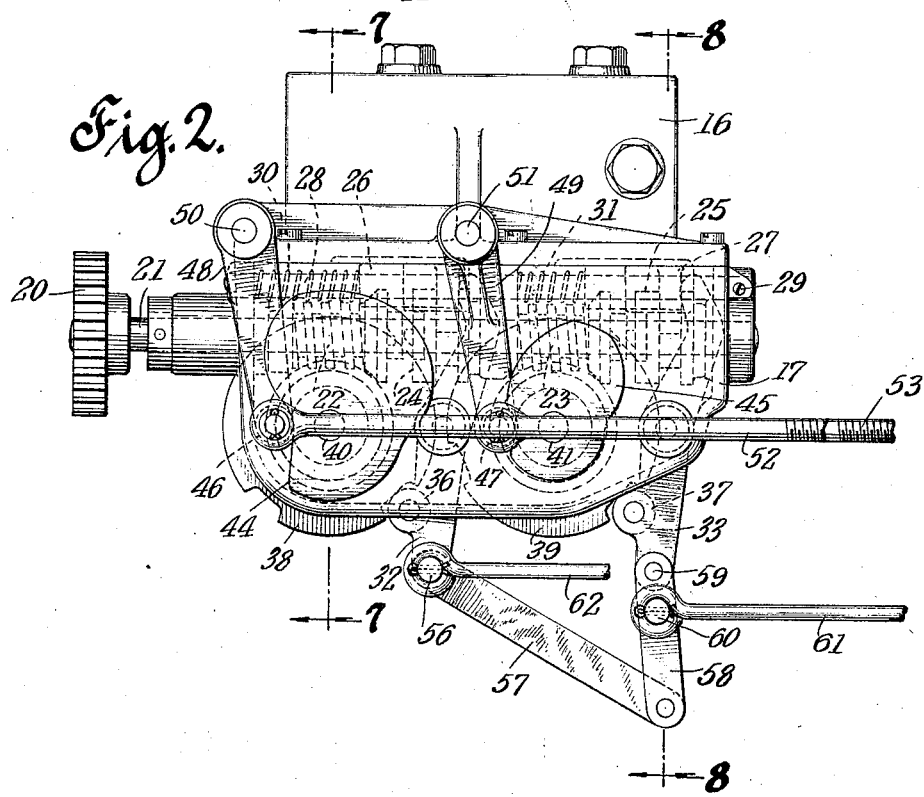
Figure 2 is a side elevational view of the same.
Figure 6:
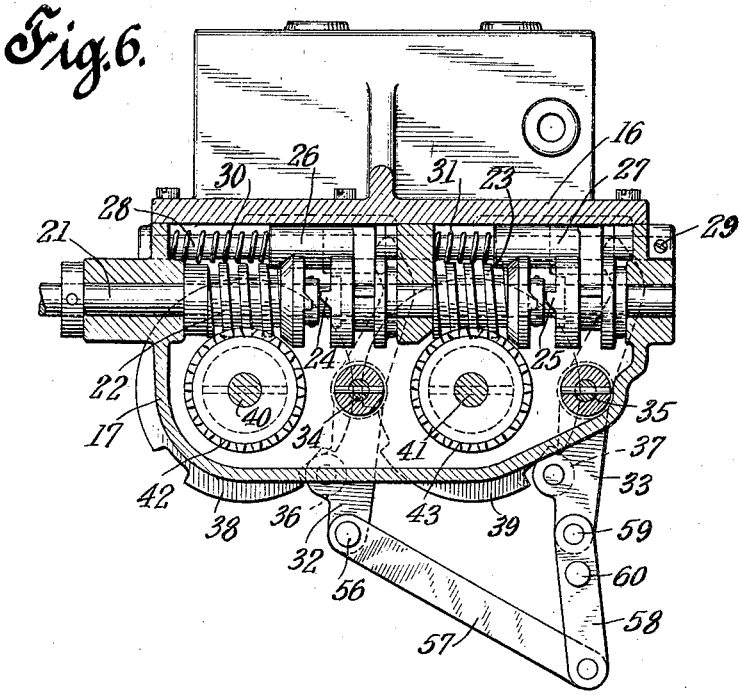
Figure 6 is a longitudinal sectional view taken on line 6—6 of Fig. 1.
Figure 7:
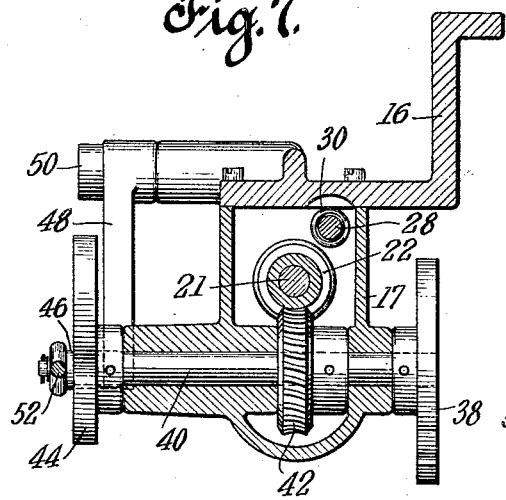
Figure 7 is a transverse sectional view taken on line 7—7 of Fig. 2.
Figure 8:
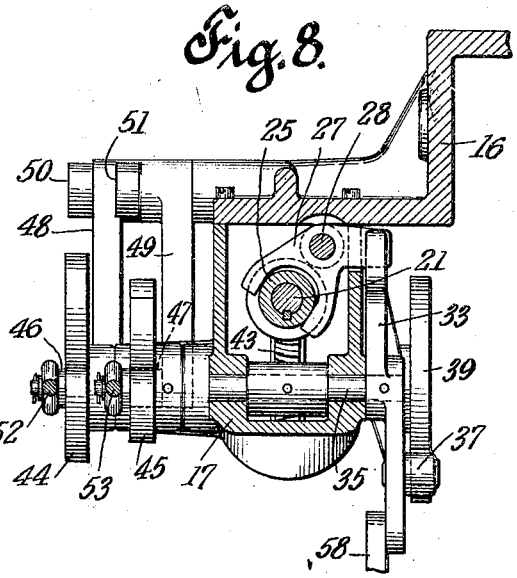
Figure 8 is a similar sectional view taken on line 8—8 of Fig. 2.

Referring in greater detail to the drawings, it will be seen that to the motor block 15 is bolted a bracket 16 supporting a housing 17 extending along the side of its front portion.

A motor driven shaft 18 has on it a spur gear 19 meshed with a pinion 20 fixed on a parallel shaft 21 journalled in the housing 17, collars being provided to prevent end movement. Freely mounted on the shaft 21, within the confines of the housing, are worms 22—23, engageable by clutches 24—25 keyed to slide on the shaft and controlled by forks 26—27 having elongated hubs freely slidable on a spindle 28 secured in the housing parallel to the shaft 21 and held by a set screw 29.

These forks 26—27 are normally pressed rearwardly by compression springs 30—31 coiled around the spindle, and are projected forwardly to cause clutch and worm engagement up forcible contact of the upper portions of levers 32—33 fixed on pins 34—35 set transversely in the housing 17.

Carried by the lower forward portions of the levers 32—33 are studs to revolubly support rolls 36—37 impinging, due to the action of the springs 30—31, against the peripheries of notched locking cams 38—39 fixed rigidly on spindles 40—41, journalled in the housing 17 in advance of the pins 34—35, and in the same horizontal plane.

The spindles 40—41 have rigidly secured on them worm gears 42—43, meshed with the worms 22—23 to be driven when the worm clutches are in engagement.

Also fixed on the spindles 40—41 are profile cams 44—45 operating rolls 46—47 carried by the lower ends of bar links 48—49 pivoted at 50—51 to bosses extending laterally from the bracket 16, and to the studs on which the rolls 46—47 are mounted are attached rods 52—53 provided with length adjusting means and connected directly with the clutch and brake levers, respectively 54—55, of the vehicle.

Pivotally connected to the lower end of the clutch lever 32, by a stud 56, is a link 57 in turn pivoted to an arm 58 pivoted at 59 to the brake lever 33.

Attached to a stud 60 set in the arm 58 is a rod 61, a similar rod 62 being connected to the stud 56, these rods being extended through and tensioned at the rear ends in the opposed equal arms of a tilting lever 65 centrally pivoted on a transverse spindle 66.

The spindle 66 is journalled in a bracket 67 clamped to the lower end of the steering post 68, and has fixed to it a bevel gear 69 meshed with a mating gear 70 secured to the lower end of a shaft 71 rotatable in the bracket 67 and also in a similar bracket 72 near the top of the post.

At the upper end of the shaft 71 is fixed a two armed lever handle terminating in pads 73—74 which extend within and closely adjacent the rim of the steering wheel 75.

From the foregoing it will be understood that a driver may make contact with either of the pads without removing the hand from the steering wheel, causing the shaft 71 to partially turn in either direction and transmit motion through the gears to the rods 61—62 at will.

For instance, if the pad 74 is drawn forward the rod 62 will be stressed, removing the roll 36 from the locking cam 38 and at the same time compressing the spring 30 and engaging the clutch 24 with the worm 22.

The worm 22 is in mesh with the worm gear 42 fixed on the spindle 40, carrying the cam 44, which is thus rotated and, due to the connections described, releases the transmission clutch.

In a similar manner, if the pad 73 be moved out of normal position, the rod 61 will be stressed, releasing the locking cam 39 engaging the clutch 25 with the worm 23 which, by reason of being meshed with a worm gear 43 on the spindle 41, rotates the cam 45 setting the brakes on the car.

A continued movement of the pad 73 may be transmitted through the arm 58 and link 57 to actuate the lever 32 which, as before stated, releases the transmission clutch.

It is to be noted that the power of the motor is thus employed in performing these operations and that the usual clutch and brake pedals need not be used in controlling the car, thereby relieving the driver to a very considerable extent.

It is to be noted that the left hand pad 74 operates only to disengage the clutch, while the opposite pad 73 sets the brake at the first stage of its movement and thereafter upon further movement releases the clutch by means of the links 57—58, the movement being very moderate in extent as clearly seen in Fig. 4, which shows in broken links the relative movement of each pad.

As shown in Fig. 3 the cam 44 has released the clutch as indicated by the position of the clutch pedal lever 54, without interference of the other pedal lever 55 actuating the brake.

Although the improvement has been described with considerable detail and with respect to a certain particular form of the invention, it is not desired to be limited to such details since many changes and modifications may well be made without departing from the spirit and scope of the invention in its broadest aspect.

Having thus described the invention, what is claimed as new and desired to secure by Letters Patent, is:—

1. In a motor vehicle, a shaft driven by the motor, a worm freely rotatable on said shaft, a clutch keyed to slide on the shaft into and out of driving engagement with said worm, a lever to control said clutch, said lever being actuable from within the vehicle, a transverse spindle having a worm wheel thereon in mesh with said worm, a cam on said spindle, and means actuated by said cam to control the brakes of the vehicle.

2. In a motor vehicle, a shaft driven by the motor, a worm freely rotatable on said shaft, a clutch keyed to slide on the shaft into and out of driving engagement with said worm, a lever to control said clutch, said lever being actuable from within the vehicle, a transverse spindle having a worm wheel thereon in mesh with said worm, a cam on said spindle, means on said spindle to retain clutch engagement during a definite portion of one revolution of said cam, and means actuated by said cam to control the vehicle brakes.

3. In a motor vehicle, the combination with clutch and brake actuating connections, of a lever for each connection, a cam to operate each lever, a motor driven shaft to drive said cams, and selective means to couple either of said cams to said shaft.

4. In a vehicle, a motor driven shaft, a pair of worms loosely mounted in tandem on said shaft, each worm having a clutch keyed to said shaft, transverse spindles each having a wheel meshed with said worm, cams fixed on said spindles, pivoted levers actuated by said cams, said levers being operatively connected with the brake mechanism of the vehicle, and means carried within the vehicle to engage and disengage said clutches relative to the worm.

5. A control mechanism for clutch and brake actuating connections comprising a shaft driven by the motor of the vehicle, worms on said shaft having controllable clutches, independent cams for the clutch and brake connections each being in mesh and selectively driven by said worms, and means accessible from within the vehicle to control the actuation of said cams.

6. A control mechanism for clutch and brake actuating connections comprising a shaft driven by the motor of the vehicle, worms on said shaft having controllable clutches, independent cams for the clutch and brake connections, means accessible from the interior of the vehicle to engage either of the worms selectively with said shaft whereby either the clutch and brake connections are actuated independently, and means to actuate the clutch connections progressively after actuation of the brake connections.

7. A clutch and brake control device for a motor vehicle comprising a shaft rotated by the motor, a pair of worms free on said shaft to be clutched thereto, worm wheels engaged by said worms on spindles transverse to said shaft, a cam on each spindle, means actuated by said cams to control the clutch and brake levers, and means to control the clutching of said worms to the shaft.

8. A clutch and brake control device comprising a motor driven shaft, a pair of spindles geared to said shaft, means to control the actuation of each spindle independently, a cam on each spinde, levers engaged by said cams, and connections between said levers and the clutch and brake pedals respectively.

9. In a motor vehicle having clutch and brake control pedals, a shaft driven by the motor, independent actuating means operatively connected with said pedals, and means for coupling either of said actuating means with said shaft selectively.

10. In a motor vehicle having clutch and brake control pedals, a shaft driven by the motor, separate actuating means for each pedal, and means to couple either of said actuating means with said shaft.

11. In a motor vehicle having clutch and brake control pedals, a shaft driven by the motor, separate actuating means for each pedal, means to couple either of said actuating means with said shaft, and means to release the coupling means after completion of the pedal movement.

12. In a motor vehicle having clutch and brake control pedals, a shaft driven by the motor, separate actuating means for each pedal, and a two armed lever to couple either of said actuating means with said shaft selectively.

13. In a motor vehicle having clutch and brake control pedals, a shaft driven by the motor, separate actuating means for each pedal, and a two armed lever to couple either of said actuating means with said shaft selectively, said lever when moved in one direction in excess of normal coupling both of said actuating means.

14. In a device for using the motor of a vehicle to apply the brakes, a housing fixed to the motor casing, a shaft in said housing driven by the motor, a pair of spindles having profile and locking cams, a lever connected to the brake pedal engaged by said profile cams, a second lever engaged by said locking cams to couple said spindles and shaft, and means to control said second lever.

15. In a device for using the motor of a vehicle to release the motor clutch, a housing fixed to the motor casing, a shaft in said housing driven by the motor, a pair of spindles having profile and locking cams, a lever connected to the brake pedal engaged by said profile cams, a second lever engaged by said locking cams to couple said spindles and shaft, and means to control said second lever.

16. In a device for using the motor of a vehicle to apply the brakes and release motor drive clutch, a housing on the motor casing, a shaft in said housing driven by the motor, two spindles each having a profile and locking cam, levers connected to the brake and clutch pedals of the vehicle, said levers being actuated by the respective profile cams, a second pair of levers spring pressed against said locking cams, said second levers being operative to couple the respective spindles and shaft, and means to actuate either of said second levers selectively.

In testimony whereof I affix my signature.

ANTHONY J. VASSELLI.